United States Patent [19]

Carrier et al.

[11] Patent Number: 5,001,086
[45] Date of Patent: Mar. 19, 1991

[54] SINTERED GLASS-CERAMIC BODY AND METHOD

[75] Inventors: Gerald B. Carrier, Corning; Gaylord L. Francis, Painted Post; Robert J. Paisley, Corning; Donald M. Trotter, Jr., Newfield; Kathleen A. Wexell, Corning, all of N.Y.

[73] Assignee: Corning Incorporated, Corning, N.Y.

[21] Appl. No.: 426,857

[22] Filed: Oct. 26, 1989

[51] Int. Cl.$^5$ ........................ C03C 10/08; C03C 3/085
[52] U.S. Cl. .......................................... 501/9; 501/61; 501/62; 501/67; 501/69
[58] Field of Search .................... 501/9, 61, 62, 67, 69

[56] References Cited

U.S. PATENT DOCUMENTS 3,450,456 6/1969 Stong ........................................ 501/9
4,540,671 9/1985 Kondo et al. ............................ 501/9

Primary Examiner—Mark L. Bell
Attorney, Agent, or Firm—Milton M. Peterson; Clinton S. Janes

[57] ABSTRACT

There is disclosed a sintered, alpha-cordierite solid solution glass-ceramic body in which the properties of coefficient of thermal expansion and modulus of rupture are stabilized and controlled by using a combination of two dopants in the glass during sintering and crystallization. There is further disclosed the method of producing such bodies, and controlling such properties, through the use of the two dopants.

7 Claims, No Drawings

SINTERED GLASS-CERAMIC BODY AND METHOD

FIELD OF THE INVENTION

The invention is directed to the production of sintered glass-ceramic bodies, and to the control of certain physical properties in such bodies.

INTRODUCTION

Naturally occurring, crystalline cordierite is commonly identified as alpha-cordierite, and assigned the stoichiometric, molar oxide formula $2MgO \cdot 2Al_2O_3 \cdot 5SiO_2$. However, up to eight moles of $SiO_2$ may be accepted without altering the basic crystal structure. Further, other oxide constituents may be present in glasses from which glass-ceramics having an alpha-cordierite primary crystal phase are produced. Accordingly, the term "alpha-cordierite solid solutions" has been adopted to encompass any crystal phase having the characteristic alpha-cordierite structure. Likewise, "alpha-cordierite solid solution glass-ceramic" refers to a glass-ceramic having such a primary crystal phase, and "alpha-cordierite glass" refers to the precursor glass.

Considerable attention has heretofore been given to selecting materials for use in substrates and packaging for integrated circuits. Organics have been widely used, but have limited temperature capabilities and may lack adequate hermeticity. Consequently, alumina has become the standard material where temperature is involved. However, its coefficient of thermal expansion ($65 \times 10^{-7}/°$ C.) is not a match for silicon chips, and its dielectric constant is relatively high.

Therefore, largely because of their relatively low coefficients of thermal expansion, alpha-cordierite solid solution glass-ceramics have been the object of recent studies. Some of the history is reviewed in copending application Ser. No. 07/238,574 (Holleran et al.), now U.S. Pat. No. 4,897,509 filed Aug. 31, 1988 and assigned to the assignee of this application.

The Holleran et al. application discloses modified alpha-cordierite solid solution compositions that can be sintered below 1000° C. This low temperature firing permits co-sintering of substrate and metallizing, that is, firing metal paste circuitry and its substrate in one operation. It also permits using better conductors, such as gold and copper. The compositions, expressed in weight percent on an oxide basis, consist essentially of 2–18% MgO, 0–21% ZnO, the total MgO+ZnO being 10–25%, 20–38% $Al_2O_3$, 40–52% $SiO_2$, and 2–15% total of at least one oxide selected from up to 8% $K_2O$ and/or $Rb_2O$ and/or $Cs_2O$, up to 10% CaO and/or SrO and/or BaO and/or PbO, and up to 5% $B_2O_3$.

Co-pending application Ser. No. 07/273,586 (Francis et al.), now U.S. Pat. No. 4,906,514, filed Nov. 21, 1988 and assigned to the assignee of this application, describes the use of alpha-cordierite solid solution glass-ceramic as a substrate in electrical components. More particularly, that application is directed to metallizing pastes adapted to use in forming circuitry on such substrates.

Customarily, glass-ceramic bodies are formed in the glassy state. The glass body is then subjected to a crystallizing heat treatment referred to as "ceramming". However, U.S. Pat. No. 3,940,255 (Harrington et al.), teaches that a substantial amount of glassy phase may result.

Accordingly, particularly in the electrical components field, it has become the practice to quench a stream of molten glass and pulverize the resulting fragments of glass to a powder. The powdered glass may then be formed to the desired shape and fired. This forms a dense, sintered body that may then be crystallized to a glass-ceramic state.

The Harrington et al. patent teaches that a small amount of nucleating agent, combined with finely ground glass, enhances the degree of crystallization that occurs at a crystallizing temperature. Thereby, the amount of glassy phase is reduced. The patent further teaches that the amount of nucleating agent added to the glass may, and should, be much smaller than normally used. It is suggested that the nucleating agent may be added to the powdered glass after melting. However, a clear preference is shown for the standard practice of incorporating the nucleating agent in the glass batch prior to melting.

PURPOSES OF THE INVENTION

In the course of developing a commercial process for sintered, alpha-cordierite solid solution glass-ceramic substrates to be used with integrated circuits, it was discovered that physical properties, particularly coefficient of thermal expansion, could vary significantly with no apparent change in the parent glass.

A basic purpose, then, is to provide sintered, alpha-cordierite solid solution glass-ceramic bodies having controlled and stabilized properties.

Another purpose is to provide means for controlling and stabilizing certain properties during the production of such sintered bodies.

A further purpose is to provide a method of producing such bodies having enhanced mechanical strength.

A still further purpose is to provide greater flexibility in material preparation for sintered, alpha-cordierite solid solution glass-ceramic bodies.

SUMMARY OF THE INVENTION

An article in accordance with our invention is composed of a sintered, alpha-cordierite solid solution glass-ceramic having a primary crystal phase with an alpha-cordierite structure and a secondary crystal phase with a gahnite structure, the relative amounts of the alpha-cordierite and gahnite crystal phases, as shown by x-ray diffraction (XRD) peaks, being in the range of 4:1 to 6:1, preferably about 5:1, the glass-ceramic having a coefficient of thermal expansion (CTE) in the range of $26-30 \times 10^{-7}/°$ C. and a modulus of rupture (MOR) of at least 25 Kpsi. Another aspect of our invention is a method of producing a sintered, alpha-cordierite solid solution, glass-ceramic body which comprises, a. providing a glass that is capable of being nucleated and crystallized to form a glass-ceramic material having a primary crystal phase of alpha-cordierite solid solution, and that is essentially free from devitrification, b. pulverizing the glass to a powder, c. adding two dopants to the glass powder to control properties in the sintered body, one dopant being at least 0.001% by weight of finely divided, pre-crystallized alpha-cordierite solid solution, and the second being up to about 5% by weight of a nucleating agent selected from $TiO_2$, MgO and talc.

d. shaping the doped powder to desired form, and e. firing to sinter the body and create a primary crystal phase of alpha-cordierite in the sintered body.

In preferred embodiments, the glass is melted and quenched, the materials are reduced to less than about 5 microns in size with a target of 3.5 microns mean particle size, the second additive is added in amounts of 0.5-3%, preferably about 2% $TiO_2$, the coefficient of thermal expansion, after ceramming, is maintained in the range of $26-30\times10^{-7}/°$ C. and modulus of rupture is at least 25 Kpsi.

A further aspect of the invention is a method of controlling the physical properties of a sintered alpha-cordierite solid solution glass-ceramic body which comprises mixing a powdered glass frit, capable of crystallization to a glass-ceramic having alpha-cordierite solid solution as a primary crystal phase, with, as a first additive, at least 0.001% finely divided, pre-crystallized alpha-cordierite and, as a second additive, up to 5% of a nucleating agent selected from $TiO_2$, MgO and talc, forming a body from the mixture, and firing the body to sinter and crystallize the glass, the additives increasing the MOR of the body and stabilizing the CTE, preferably in the range of $26-30\times10^{-7}/°$ C.

PRIOR LITERATURE

In addition to the applications and patent already noted, the following patents may be of interest.

U.S. Pat. No. 4,015,048 (Martin) discloses sinterable powdered glasses having the basic alpha-cordierite oxide components and modified by at least one modifying oxide selected from the group consisting of BaO, PbO, SrO and CaO. The modifiers are incorporated in the glass composition, not as dopants to the powdered glass.

U.S. Pat. No. 3,778,242 (Francel et al.) discloses lead-zinc-borate sealing glasses mixed with a refractory oxide, such as beta-eucryptite, and a minute amount of a pre-crystallized lead-zinc-borate glass. The resulting sealing glass compositions are said to have an increased compressive stress, and to be useful in joining alumina ceramic components in microelectronic circuitry. THe materials disclosed are distinctly different from those employed in the present invention.

DESCRIPTION OF THE INVENTION

There are numerous disclosures of alpha-cordierite glasses in the literature, including the Harrington et al. patent and the pending applications previously noted. These are incorporated herein by reference.

The present invention is based on discoveries made in the course of developing a process for producing a sintered, alpha-cordierite solid solution glass-ceramic body.

Initially, glasses used in developing such glass-ceramic bodies were quenched from the melt and ball milled. The resulting powdered glass was mixed with organics to form a casting slurry. This slurry was tape cast, dried and fired. This removed the organics, and subsequently sintered and crystallized the glass to the glass-ceramic state.

The glass being used was a ZnO-modified glass as disclosed in the pending Holleran et al. application. The fully sintered and crystallized body was targeted to have a CTE of $26-30\times10^{-7}/°$ C. and a MOR of at least 25 Kpsi. In the course of scaling up the material preparation procedure, a number of changes were made. One such change, from use of a ballmill to use of a vibratory mill, was found to have a profound effect.

When this change was made, control of CTE, which had been marginal before, was completely lost.

X-ray diffraction (XRD) studies of the two differently milled materials were made at various stages in their sintering and crystallizing firing cycle. These revealed major variations occurring, both in the rate and degree of crystal phase development. Such studies showed that a metastable, mu-cordierite phase, having a beta-quartz crystal structure, developed initially in each material. This subsequently was replaced by an alpha-cordierite type structure in each case. However, both the initial crystal development and the change initiated about 50° C. earlier in the ballmilled material. Thus, the mu-cordierite phase appeared at about 850° C. in the ballmilled material, but not until about 900° C. in the vibratory milled material.

Of more significance was the development of a secondary crystal phase, generally termed a gahnite phase and having a spinel structure. In the ballmilled material, this phase developed later than the change to alpha-cordierite. It tended to be in a small, but relatively consistent, ratio to the alpha-cordierite solid solution phase. In contrast, the spinel phase appeared coincident with the cordierite phase change in the vibratory milled material. It developed more erratically, but usually to a greater extent than in the ballmilled material. "Gahnite" is a generally accepted, mineral name for the zinc analog of spinel ($MgAl_2O_4$). Gahnite and spinel form a continuous solid solution between the end members. XRD data indicate a very limited presence of Mg in the gahnite phase of the present materials. However, to the extent that solid solutions do occur and have the characteristic spinel-type crystal structure, they are encompassed within the term "gahnite crystal phase" as used herein.

The XRD studies, confirmed by chemical studies, revealed substantial contamination of the ballmilled material, but much less contamination in the vibratory milled material. These studies suggested a possible seeding effect, or other variable effect, by the contaminants on crystallization.

Accordingly, numerous additives, or dopants, were investigated to determine what, if any, seeding action might be exerted on the crystal phases involved. It was found that powdered, pre-crystallized, alpha-cordierite solid solution glass-ceramic had a remarkable effect as an additive. As little as 0.001% by weight tended to stabilize both the CTE and MOR of a fully sintered and crystallized glass-ceramic having a primary alpha-cordierite solid solution crystal phase.

The effect of the pre-crystallized additive appeared similar to that of the unintended contaminants from the ballmill. However, it appeared to be even more selective with respect to mu-cordierite, and consequent alpha-cordierite solid solution development. As an apparent result of the selective action, the MOR was within a normal range of 20 to 23 Kpsi, but the CTE was reduced to about $21\times10^{-7}/°$ C. That value was considerably below a desired range of 26-30 units, and approached the value of pure alpha-cordierite.

Accordingly, it became necessary to seek a further dopant to increase the CTE value without adverse effect on the MOR. Among the numerous dopants tried, talc, titania and magnesia were found to be most effective. Of these, it was found that talc and titania also increased the MOR value above the previous level. Also, a new initial crystal phase, identifiable as a magnesium aluminum silicate phase having a petalite crystal structure, appeared along with the mu-cordierite. Both subsequently disappeared and were replaced by an alpha-cordierite solid solution phase.

At least a half percent of the talc, titania, or magnesia is generally necessary for a significant effect. While up to 5% may be employed, over about 3% tends to interfere with densification. The optimum control appears to be obtained with titania.

The dopants of our invention are considered to be effective in stabilizing properties in any sintered alpha-cordierite solid solution glass-ceramic material. However, a preferred use is sintered alpha-cordierite glass-ceramic articles wherein the precursor glass is selected from the composition family set forth in the pending Holleran et al. application. These glasses consist essentially, in calculated percent by weight on the oxide basis, of 2-18% MgO, up to 21% ZnO, the total MgO+ZnO being 10-25%, 20-38% $Al_2O_3$, 40-52% $SiO_2$, and 2-15% total of at least one oxide selected from up to 8% $K_2O$ and/or $Rb_2O$ and/or $Cs_2O$, up to 10% CaO and/or SrO and/or BaO and/or PbO, and up to 5% $B_2O_3$. The ZnO content should be sufficient to provide a secondary gahnite crystal phase in the glass-ceramic in an amount such that the ratio of alpha-cordierite to gahnite phase is within the range of 4:1 to 6:1, as shown by XRD peaks. The crystallized glass-ceramic will further have a CTE of $26-30 \times 10-7/°$ C., and an MOR greater than 25 Kpsi.

SPECIFIC EMBODIMENT

In exploring the ramifications of the invention, the glass employed had the following composition, in calculated weight percent: 51.0% $SiO_2$, 24.8% $Al_2O_3$, 13.1% MgO, 3.1% BaO, 1.4% $B_2O_3$ and 6.6% ZnO. The glass was drawn as thin BaO ribbon, quenched and milled in a vibratory mill unless otherwise indicated. The dopants were separately milled for control purposes.

Numerous casting slips were prepared by blending glass and dopants with organics, including a binder, solvent, dispersant and plasticizer. The slips were then tape cast, with the aid of a 6-inch doctor blade, as sheets having green thicknesses of 10-30 mils. The sheets, or tapes, thus formed, were dried, and stacked and laminated as necessary to provide a desired ultimate thickness.

The laminated bodies were fired at 300° to 550° C. to burn out organic. They were then heated to 950° C. to form sintered, alpha-cordierite solid solution glass-ceramic bodies. The glass frit softened at 600°-750° C., underwent viscous sintering at 750°-900° C., and crystallized at higher temperatures, e.g. at 950° C.

The effect of pre-crystallized alpha-cordierite as a dopant may be seen from the data in TABLE 1. Therein, the CTE, MOR and relative X-ray peaks for alpha-cordierite: gahnite are shown for four levels of dopant in both ball milled and vibratory milled glasses. Dopant level is in weight percent; CTE is in units of $10^{-7}/°$ C.; MOR is in Kpsi; X-ray peaks are measured by X-ray diffraction, and shown as C/G peaks.

TABLE 1

| Ball mill | | | | |
| --- | --- | --- | --- | --- |
| Doping level | 0.00 | 0.05 | 0.1 | 0.2 |
| CTE | 21.9 | 21.8 | 21.4 | 21.8 |
| MOR | 27.3 | 27.0 | 29.4 | 26.9 |
| C/G peaks | 100:18 | 100:17 | 100:19 | 100:18 |
| Vibratory mill | | | | |
| Doping level | 0.00 | 0.05 | 0.1 | 0.2 |

TABLE 1-continued

| | | | | |
| --- | --- | --- | --- | --- |
| CTE | 50.0 | 21.7 | 21.4 | 20.9 |
| MOR | 12.6 | 27.9 | 30.6 | 28.9 |
| C/G peaks | 100:62 | 100:19 | 100:18 | 100:17 |

TABLE 2 sets forth similar data, arranged in the same manner, for different doping levels of talc and fumed $TiO_2$. The dopants were added to vibratory milled frit containing 0.05% pre-crystallized alpha-cordierite.

TABLE 2

| Talc | | | | |
| --- | --- | --- | --- | --- |
| Doping level | 1.0 | 2.0 | 3.0 | 5.0 |
| CTE | 22.5 | 24.7 | 24.3 | 26.9 |
| MOR | 23.3 | 26.2 | 24.5 | 23.9 |
| C/G peaks | 100:17 | 100:18 | 100:19 | 100:19 |
| $TiO_2$ | | | | |
| Doping level | 1.0 | 2.0 | 3.0 | 5.0 |
| CTE | 25.6 | 28.3 | 30.5 | 32.2 |
| MOR | 30.3 | 32.7 | 31.5 | 29.4 |
| C/G peaks | 100:19 | 100:20 | 100:20 | 100:20 |

Further experiments were conducted to determine the effect of varying material particle size on properties. These tests were made using a dopant combination considered optimum, that is, 0.05% pre-crystallized cordierite and 2.0% $TiO_2$. The latter was used in its customary particle size of two microns, and also in a submicron size provided by fumed $TiO_2$. Also, the glass frit was used in two average particle sizes, 3.5 microns and 2.1 microns.

No significant effects were noted on CTE values which remained about $29 \times 10-7/°$ C. However, MOR values were substantially enhanced by reduction in particle size. Thus, double doping with normal particle materials increased the MOR value from about 22 Kpsi to about 25 Kpsi. However, use of the submicron $TiO_2$ for doping raised the MOR to about 32 Kpsi. When the frit particle size was also decreased to 2.1 microns, an MOR of about 38 Kpsi was observed. Thus, the invention provides means for attaining a sintered, glass-ceramic body having an alpha-cordierite solid solution primary crystal phase of stable CTE value in the $26-30 \times 10^{-7/°}$ C. range and surprisingly high MOR values.

We claim:

1. A sintered, alpha-cordierite solid solution, glass-ceramic body having controlled CTE and MOR values, having a primary crystal phase with an alpha-cordierite structure and having, in its composition, a ZnO content sufficient to form a secondary crystal phase with a gahnite structure, the relative amounts of the alpha-cordierite and gahnite crystal phases, as shown by XRD peaks, being in the range of about 4:1 to 6:1.

2. A sintered, alpha-cordierite glass-ceramic solid solution body in accordance with claim 1 wherein the relative amounts of alpha-cordierite and gahnite crystal phases are about 5:1, as shown by XRD peaks.

3. A sintered, alpha-cordierite solid solution glass-ceramic body in accordance with claim 1 wherein the chemical composition of the precursor glass, calculated in percent by weight on the oxide basis, consists essentially of 2-18% MgO, up to 21% ZnO, the ZnO content being sufficient to form a secondary gahnite crystal phase when the glass is crystallized, the total MgO+ZnO being 10-25%, 20-38% $Al_2O_3$, 40-52% $SiO_2$ and 2-15% of at least one oxide selected from up to 8% $K_2O$ and/or $Rb_2O$ and/or $Cs_2O$, up to 10% CaO and/or SrO and/or BaO and/or PbO, and up to 5% $B_2O_3$.

4. A sintered, alpha-cordierite solid solution glass-ceramic body in accordance with claim 3 wherein the precursor glass consists of 51% $SiO_2$, 24.8% $Al_2O_3$, 13.1% MgO, 3.1% BaO, 1.4% $B_2O_3$ and 6.6% ZnO.

5. A sintered, alpha-cordierite solid solution glass-ceramic body in accordance with claim 1 containing 0.5–5% $TiO_2$ as an additive.

6. A sintered, alpha-cordierite solid solution glass-ceramic body in accordance with claim 5 containing about 2% $TiO_2$.

7. A sintered, alpha-cordierite solid solution glass-ceramic body in accordance with claim 1 wherein the body has a coefficient of thermal expansion in the range of $26-30 \times 10^{-7}/°$ C. and a modulus of rupture of at least 25 Kpsi.

* * * * *